3,400,091
SEALING COMPOSITIONS COMPRISING CIS 1,4-POLYBUTADIENE, PLASTICIZER AND CURATIVE SYSTEM
Nelson A. Stumpe, Jr., Bartlesville, Okla., assignor to Phillips Petroleum Company, a corporation of Delaware
No Drawing. Continuation of application Ser. No. 386,070, July 29, 1964. This application Oct. 18, 1967, Ser. No. 676,364
6 Claims. (Cl. 260—23.7)

ABSTRACT OF THE DISCLOSURE

Improved calking compositions comprise polybutadiene, a curative system and a filler comprising the predominants of the calking compositions and an amount of plasticizer sufficient to provide a Mooney viscosity (212° F.) of less than 10 prior to curing.

---

This application is a continuation of my copending application, Ser. No. 386,070, filed July 29, 1964, now abandoned.

This invention relates to calking compositions. In one aspect, this invention relates to calking compositions comprising conjugated diene polymers. In another aspect, this invention relates to sealing an opening or joint with a permanently resilient seal.

Calking compounds of various types and compositions have long been known and widely used in the art. These materials, which can be applied with a gun or knife, are soft, fairly viscous substances, are adhesive to various materials, and harden to greater or lesser extent with the passage of time. Typical of such compositions is glazier's putty, generally made by mixing calcium carbonate (whiting) with a drying oil such as boiled linseed oil. In compositions of this type the drying oil component sets up as a result of the oxidation effect of air and is thus the actual sealing agent, the mineral filler giving body thereto being held in place by the dried oil. Since there is little, if any, interaction between the drying oil and the filler, such compositions often fail when applied to surfaces which absorb the oil therefrom. It has also been observed that some conventional sealants if prepared in a consistency suitable for convenient applications with, for example, a calking gun, tend to flow from vertical joints, thus leading to imperfect seals and/or unsightly joints.

In accordance with this invention, I have discovered that calking compositions containing essentially pigment (filler) and volatile and non-volatile vehicles are greatly improved by the addition of a minor amount of polybutadiene, preferably polybutadiene formed by cis 1,4-addition of 1,3-butadiene, with a curative system. These compounds harden on the outside when exposed to air, thereby providing a surface which does not pick up dust from the atmosphere and which can be painted along with adjacent structures when desired. Beneath the surface the compound remains resilient, thereby adjusting to vibration, thermal expansion, or other structural variation without cracking or pulling away from the underlying surface.

Accordingly, it is an object of this invention to provide novel calking compounds. Another object of this invention is to provide a compound which does not flow from a joint when applied thereto. Another object of this invention is to provide a calking compound which is readily applied with a gun or knife. Still another object of this invention is to provide a compound wherein the surface hardens when exposed to air, and the interior of which remains resilient. Another object of this invention is to provide an improved method of calking joints.

Other aspects, objects and advantages will be apparent from a study of the disclosure and appended claims.

The above and other objects of this invention are accomplished by mixing materials comprising generally about 10 to about 22 weight percent of polybutadiene, preferably being at least 85 percent cis 1,4-structure; a curative system for said polymer, about 54 to about 64 weight percent of a filler, and sufficient plasticizer to obtain a composition having a ML-4 Mooney viscosity of less than 10 at 212° F. prior to curing or vulcanization. Generally, the plasticizer will be about 25 weight percent, however, such quantity is dependent upon the Mooney viscosity of the polymer employed and the type of filler employed. Of course, additives such as antioxidants, softeners, and preservatives can be present in the composition depending upon the properties desired and the intended application. The ranges given are in weight percent of the total composition.

The polybutadienes which are utilized in the compositions of this invention can be produced by any of the known polymerization processes and preferably those which yield predominantly cis 1,4-butadiene polymers. The cis polybutadienes which are preferred in the compositions of this invention will have a viscosity between 10 and 130 as measured on the ML-4 Mooney viscometer at 212° F. in accordance with ASTM D1646-61 test procedure. A more desirable range of ML-4 (212° F.) Mooney viscosity is from 20 to 60, inclusive. The preferred polybutadiene as contemplated herein is one in which at least 85 percent and up to 100 percent, of the polymer is formed by cis 1,4-addition of the butadiene, the remainder of the polymer being formed by trans 1,4- and 1,2-addition of butadiene. The amount of the said polybutadiene which is employed in the composition of this invention, the cis 1,4 content of the polymer, and the Mooney viscosity of the polybutadiene will all depend on the desired use and method of application.

As indicated, the polybutadiene useful in this invention can be prepared by various methods, this invention being in the blended composition. One method of preparing such polymers is the polymerization of 1,3-butadiene in the presence of a catalyst composition comprising (a) a trialkyl aluminum and (b) titanium tetraiodide. The polybutadiene produced by this method is one in which the rubbery polymer is formed by cis 1,4-addition, trans 1,4-addition, and 1,2-addition, at least 85 percent of the polymer being formed by cis 1,4-addition.

The percentage of polymer formed by cis 1,4-addition, trans 1,4-addition, and 1,2-addition (vinyl) is determined by dissolving the polymer in carbon disulfide to form a solution having 25 grams of polymer per liter of solution, and then determining the infrared spectrum (percent transmission) of the solution.

The percent of the total unsaturation present in trans 1,4- is calculated according to the following equation and consistent units:

$$\epsilon = \frac{E}{tc}$$

where $\epsilon$ = extinction coefficient (liters-mols$^{-1}$ - centimeters$^{-1}$);
$E$ = extinction (log $I_0/I$); $t$ = path length (centimeters); and $c$ = concentration (mols double bond/liter). The extinction is determined at the 10.35 micron band and the extinction coefficient was 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each $C_4$ unit on the polymer.

A preferred catalyst comprises titanium tetraiodide and triethylaluminum or triisobutylaluminum, since these latter two alkylaluminums have high activity in the process. The amount of trialkylaluminum in the catalyst composition is usually in the range of 1.25 to 50 mols per mol of titanium tetraiodide with the preferred range being from 1.5 to 35 mols per mol. The total amount of catalyst can vary over a wide range. The concentration of the total catalyst, titanium tetraiodide plus trialkylaluminum, is usually in the range of about 0.05 weight percent to 10 weight percent or higher, preferably in the range of 0.05 to 5 weight percent, based on the total amount of 1,3- butadiene charged to the reaction zone. In general, at the lower mol ratio of trialkylaluminum to titanium tetraiodide, it is desirable to operate above the minimum level of catalyst concentration. Another preferred catalyst system comprises a titanium tetraiodide, titanium tetrachloride and triethylaluminum or triisobutylaluminum.

The polymerization of the butadiene can be carried out at any temperature in the range of −40° to 150° C., but it is preferred to operate in the range of −10° to 50° C. It is also preferred to carry out the polymerization in the presence of an inert hydrocarbon such as aromatics, straight and branch chain paraffins and cycloparaffins, although cycloparaffins are less desirable than the other hydrocarbons. The reaction can be carried out in the absence of any such diluent. The polymerization reaction is carried out under autogenous pressure or any suitable pressure sufficient to maintain the reaction mixture substantially in the liquid phase. The pressure will thus depend upon the particular diluent being employed and the temperature at which the polymerization is being carried out. However, higher pressures can be employed, if desired, the higher pressures being obtained by some such suitable method as the pressurization of the reactor with a gas which is inert with respect to the polymerization reaction.

At the completion of the polymerization reaction, when a batch process is used, the total reaction mixture is then treated to inactivate the catalyst and recover the polymer product. While it is to be understood that any suitable treating method can be employed, one method for accomplishing the desired treatment comprises adding to the reaction mixture a catalyst-inactivating material such as water, an alcohol, e.g., ethyl alcohol or isopropyl alcohol, an organic or inorganic acid, or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood that deactivating of the catalyst and precipitation of the polymer can be accomplished in a single step. The precipitated polymer can then be recovered by filtration, decantation, steam-stripping and water washing or the like. In order to further purify the polymer, the separated polymer can be redissolved in a suitable solvent and then again precipitated by the addition of an alcohol.

The curative system employed in the composition of this invention can be any rubber curing agents. The particular system employed will depend upon the required or desired cure time for the application of the compound.

Examples of curative additives are:

(1) Vulcanization agent—sulfur, selenium, sulfur chloride, and tellurium;

(2) Activators—stearic acid, zinc oxide, 2-thiazoline-2-thiol, zinc n-butylxanthate, 2-mercaptobenzothiazole and derivatives thereof; certain dithiocarbamates, bis(thiocarbamoyl)sulfides, guanidines, aldehyde-amine reaction products, thiocarbanilide, and the like;

(3) Accelerators—tetraethyl thiuram disulfide, di-n-butylammoniumoleate, 1,3-diphenyl guanidine phthalate, zinc salts of fatty acids, and the like.

Fillers operable to this invention can be any of the rubber filling type materials. Examples of suitable fillers include, singly or in combination, carbon black, boron nitride, clay, the oxides of metals selected from the group consitsing of aluminum, magnesium, zinc, lead, and tin; aluminum hydrate, aluminum silicate, asbestos fibers and powders, barium carbonate, barium sulfate, calcium carbonate, calcium silicate, calcium sulfate, cellulose fibers, coke, diatomaceous earth, graphite, magnesium carbonate, magnesium silicate, silica, talc, and the like. Clay is a preferred filler and will generally comprise at least 60 percent of the filler employed.

The plasticizer employed in this invention can be any rubber plasticizer. Examples of suitable plasticizers include, singularly or in combination, beeswax, butylstearate, calcium stearate, castor oil, cotton seed oil, diethylene glycol, glycerine, mineral oils, paraffin wax, pine oil, polyethylene glycol esters, rosin oil, stearic acid, liquid polybutadiene, and the like.

Any rubber antioxidant is suitable for incorporation in the compounds of this invention, for example, diaryl-p-phenylene diamine, alkylated phenols, tri(nonylphenyl) phosphite, diarylamine ketone, N,N'-diphenyl-p-phenylenediamine, phenyl-beta-naphthylamine, diaryl-p-phenylenediamine, di- and tristyrenated phenols, certain ketone reaction products of primary arylamines, aldehyde-primary amine reaction products alkarylamines, primary aromatic amines, and the like.

This invention will now be described more fully with reference to the following examples which are intended to be nonlimitative.

EXAMPLE I

A commercial glazing compound recommended for use on metal or wood windows (Nu Glase-Glazing Compound) was applied to two metal window sashes. This material has a spongy feel after application, but is not rubbery in the sense of elongation. After nine months' exposure to weathering this material still had a slight spongy feeling, but was crumbly when cut. On one of the two sashes the glazing compound had loosened on the glass. It was necessary to scrape this material off to get a clean sash.

EXAMPLE II

A second commercial glazing compound recommended for use on metal sashes was applied to two metal window sashes. This material was very soft and nonrubbery. After nine months' exposure to weathering this material was quite hard and crumbly. It was necessary to scrape this material off to get a clean sash.

EXAMPLE III

A polybutadiene having about 96 percent cis 1,4-configuration (determined as described supra) was prepared using the following recipe:

| | Parts by weight |
|---|---|
| 1,3-butadiene | 100 |
| Toluene | 1200 |
| Triisobutylaluminum | 0.50 |
| Titanium tetraiodide | 0.14 |
| Titanium tetrachloride | 0.048 |

The monomer, solvent and catalyst were introduced to a reaction vessel and the reaction was initiated at a temperature of 15° F. and continued for 3 hours at 40° F. At the end of the reaction time 0.5 phr. (part per 100 parts of rubber) of an antioxidant (2,2'-methylene-bis-4-methyl-6-tert-butylphenol) and 2.0 phr. of a shortstop (a disproportionated pale rosin stable to heat and light) were added to the reaction vessel. The polymer was recovered by steam-stripping, water-washing, and then dried. The resulting polymer was compounded as follows:

Recipe

| | Phr. |
|---|---|
| Polybutadiene | 100 |
| Stearic acid—Activator | 4 |
| Zinc oxide—Filler—Activator | 125 |
| Clay—Filler | 225 |
| Mineral oil—Plasticizer | 140 |
| Wingstay 100 [1]—Antioxidant | 2 |
| Butarez 15 [2]—Plasticizer | 10 |
| Sulfur—Vulcanization agent | 5 |
| Ethyl Tuads [3]—Accelerator | 1 |
| Captax [4]—Accelerator | 2 |

[1] Diaryl-p-phenylene diamine.
[2] A sodium-catalyzed liquid polybutadiene having a Saybolt Furol Viscosity at 100° F. of 1500, as determined by ASTM D 88-56.
[3] Tetraethyl thiuram disulfide.
[4] 2-mercaptobenzothiazole.

The polybutadiene, zinc oxide, stearic acid, Wingstay 100 and half the clay were put in a Banbury B mixer at zero time and mixed 1 minute at 150° F. and 78 r.p.m., 0.5 minute at 150° F. and 156 r.p.m., and 0.5 minute at 150° F. and 236 r.p.m. At this time the mineral oil and the remainder of the clay were added slowly at 150° F. and 78 r.p.m. during a 2-minute period. After 1 minute additional mixing at 150° F. and 78 r.p.m., the speed was increased to 118 r.p.m. for an additional 2 minutes. The stock was then cooled to ambient temperature in the Banbury mixer. During the cooling period the sulfur was mixed with half the Butarez 15 and the Tuads and Captax were mixed with the other half of the Butarez 15. The sulfur-Butarez 15 mixture was added to the cooled stock and mixed 0.5 minute at ambient temperature and 78 r.p.m. The Tuads-Captax-Butarez 15 mixture was then added and mixing was continued for an additional minute at ambient temperature and 78 r.p.m. The total stock was then mixed 0.5 minute at ambient temperature and 118 r.p.m. and 0.5 minute at ambient temperature and 236 r.p.m.

This material, having an ML-4 (212° F.) value of 8.8, was applied to two metal window sashes and a smooth seal was obtained. After nine months' exposure to weathering this material was still rubbery (elongation was over 500 percent) and was adhering tenaciously to both the metal and the glass. It can be removed cleanly by cutting at one point and pulling away from the sash.

EXAMPLE IV

Polybutadiene prepared as in Example III was compounded as follows in a manner like Example III:

Recipe

| | Phr. |
|---|---|
| Polybutadiene | 100 |
| Stearic acid—Activator | 4 |
| Zinc oxide—Filler—Activator | 125 |
| Clay—Filler | 250 |
| Mineral oil—Plasticizer | 150 |
| Butarez 15—Plasticizer | 10 |
| Nonox WSL [1]—Antioxidant | 1 |
| Polygard [2]—Antioxidant | 1 |
| Sulfur—Vulcanization agent | 5 |
| Ethyl Tuads—Accelerator | 1 |
| Captax—Accelerator | 2 |

[1] An alkylated phenol (sp. gr.=1.00).
[2] Tri(nonylphenyl)phosphite.

This material having an ML-4 (212° F.) value of 9.4 was applied to window sashes and a smooth seal was obtained. The material was still rubbery after nine months of exposure to weathering.

EXAMPLE V

Polybutadiene prepared as in Example III was compounded as follows in a manner like Example III:

Recipe

| | Phr. |
|---|---|
| Polybutadiene | 100 |
| Stearic acid | 4 |
| Zinc oxide | 125 |
| Clay | 250 |
| Mineral oil | 160 |
| Nonox WSL | 1 |
| Polygard | 1 |
| Sulfur | 5 |
| Ethyl Tuads | 1 |
| Captax | 2 |

This material having an ML-4 (212° F.) value of 9.5 was applied to window sashes and a smooth seal obtained. This material was still rubbery after nine months' exposure to weathering.

EXAMPLE VI

Polybutadiene prepared as in Example III was compounded as follows in a manner like Example III:

Recipe

| | Parts by weight |
|---|---|
| Polybutadiene | 100 |
| Stearic acid | 4 |
| Zinc oxide | 125 |
| Clay | 250 |
| Mineral oil | 150 |
| Boiled linseed oil—Plasticizer | 10 |
| Nonox WSL | 1 |
| Polygard | 1 |
| Sulfur | 5 |
| Ethyl Tuads | 1 |
| Captax | 2 |

This material having an ML-4 (212° F.) value of 8.4 was applied to window sashes and a smooth seal obtained. After nine months' exposure to weathering this material was still rubbery.

EXAMPLE VII (1) A polybutadiene prepared as in Example III having a 45 ML-4 (212° F.) and (2) a styrene-butadiene copolymer prepared by emulsion polymerization at a temperature of 41° F. and containing about 23.5 percent styrene were compounded in a Banbury mixer with a 150° F. jacket temperature in the following cycle.

Minutes:
- 0' — 118 r.p.m.; add rubber, stearic acid, antioxidants, zinc oxide and ¾ of filler.
- 0.5' — Add 2/7 of oil.
- 1.0' — Speed to 156 r.p.m.
- 1.75' — Add 1/7 of oil.
- 2.5' — Add 1/7 of oil.
- 3.0' — Add balance of filler.
- 3.5' — Add 1/7 of oil.
- 4.0' — Speed to 236 r.p.m.
- 4.5' — Speed to 156 r.p.m.; add 1/7 of oil.
- 5.5' — Add balance of oil.
- 6.5' — Speed to 236 r.p.m.
- 7.0' — Speed to 156 r.p.m.
- 8.0' — Dump.

These compounded stocks had the following recipes:

| | Phr. | |
|---|---|---|
| | 1 | 2 |
| Polybutadiene | 100 | |
| Styrene-butadiene copolymer | | 100 |
| Stearic acid, activator | 2 | 2 |
| Zinc oxide, filler, activator | 10 | 10 |
| Clay, filler | 400 | 400 |
| Mineral oil, plasticizer | 200 | 200 |
| Nonox CNS,[1] antioxidant | 1 | 1 |
| Polygard, antioxidant | 1 | 1 |
| ML–4 (212° F.) | 9.4 | 1.4 |

[1] A complex nitrogen-phenol compound (sp. gr.=1.25).

Three test samples were prepared from these stocks, as follows:

(a) A portion of stock 1 was mixed with 2 phr. sulfur and 4 phr. activated dithiocarbamate.

(b) A portion of stock 2 was mixed with 2 phr. sulfur and 4 phr. activated dithiocarbamate.

(c) A portion of stock 1 was mixed with 2 phr. of an aliphatic polysulfide polymer (Thiokol VA–7).

After being maintained at 80° F. for 8 days these samples tested as follows:

| Sample | 300% Modulus, p.s.i. | Tensile, p.s.i. | Elongation, p.s.i. |
|---|---|---|---|
| (a) | 240 | 350 | 640 |
| (b) | (1) | (1) | (1) |
| (c) | 180 | 230 | 510 |

[1] Uncured.

This comparative example indicates that emulsion-type polymers are not as effective as the solution-type polymers because sample (b) did not cure. Also, samples (a) and (c) show that different curative systems may be employed in the composition of this invention.

To one skilled in the art it will be evident that many variations and modifications of this invention can be practiced in view of the foregoing disclosure that will come within the spirit and scope of the invention.

That which is claimed is:

1. A composition of matter comprising:
   polybutadiene formed by cis 1,4-, trans 1,4- and 1,2- addition of 1,3-butadiene, at least 85 percent of said polybutadiene being formed by cis 1,4-addition of 1,3-butadiene;
   said polybutadiene comprising about 10 to about 22 percent by weight of said composition;
   a curative system;
   a filler, wherein said filler comprises about 54 to about 64 percent by weight of said composition; and
   a plasticizer in an amount sufficient to provide an ML–4 (212° F.) Mooney viscosity of less than 10 in said composition prior to curing.

2. The composition of claim 1 wherein:
   the curative system comprises sulfur, stearic acid, zinc oxide, tetraethyl thiuram disulfide, and 2-mercaptobenzothiazole; and
   said plasticizer comprises about 25 percent by weight of said composition.

3. The composition of claim 1 wherein at least about 60 weight percent of the filler is clay and the remainder of said filler is zinc oxide and, wherein said plasticizer comprises mineral oil.

4. The composition of claim 1 wherein said polybutadiene has a raw ML–4 (212° F.) Mooney viscosity within the range of about 10 to about 130.

5. The composition of claim 2 wherein at least about 60 weight percent of the filler is clay and the remainder of said filler is zinc oxide and, wherein said plasticizer comprises mineral oil.

6. The composition of claim 2 wherein said polybutadiene has a raw ML–4 (212° F.) Mooney viscosity within the range of about 10 to about 130.

References Cited

UNITED STATES PATENTS

| 2,956,972 | 10/1960 | Sterling | 260—23.7 |
| 3,245,929 | 4/1966 | Railsback et al. | 260—23.7 |
| 3,320,333 | 5/1967 | Battline | 260—846 |
| 3,325,430 | 6/1967 | Grasley | 260—25 |
| 3,342,789 | 9/1967 | Bannister et al. | 260—79.5 |

OTHER REFERENCES

Railsback et al.: "Low Temperature Properties of 80% Cis-Polybutadiene," Rubber World, vol. 138, No. 1, pages 75–84.

DONALD E. CZAJA, *Primary Examiner.*

R. A. WHITE, *Assistant Examiner.*